United States Patent [19]
Barkstrom et al.

[11] 3,945,175
[45] Mar. 23, 1976

[54] VARIABLE SPEED FEED ROLL DRIVE MECHANISM FOR FORAGE HARVESTERS

[75] Inventors: Reynold Barkstrom, Hinsdale; Calvin P. Rickerd, La Grange Park; William C. Swanson, Clarendon Hills, all of Ill.

[73] Assignee: International Harvester Company, Chicago, Ill.

[22] Filed: Oct. 2, 1973

[21] Appl. No.: 402,878

[52] U.S. Cl. .............. 56/10.8; 56/11.2; 56/14.3
[51] Int. Cl.² ........................................ A01D 69/00
[58] Field of Search ............ 60/464, 488, 489, 487, 60/445, 431; 137/569; 241/280; 56/10.9, 10.8, 11.9, 60, 61, DIG. 6, DIG. 7, DIG. 11, 11.2, 11.1, 14.3, 1; 74/473, 353, DIG. 1

[56] References Cited
UNITED STATES PATENTS

| | | | |
|---|---|---|---|
| 2,601,752 | 7/1952 | Rose | 56/10.9 |
| 3,214,911 | 11/1965 | Kempson | 60/431 |
| 3,360,933 | 1/1968 | Swanson et al. | 137/569 |
| 3,530,650 | 9/1970 | Phillips | 56/14.3 |
| 3,633,464 | 1/1972 | Yokohama-shi et al. | 60/445 |
| 3,670,590 | 6/1972 | Long et al. | 56/11.2 |
| 3,826,090 | 7/1974 | Bahl | 60/445 |

*Primary Examiner*—Louis G. Mancene
*Assistant Examiner*—James D. Hamilton
*Attorney, Agent, or Firm*—Dennis K. Sullivan; Floyd B. Harman

[57] ABSTRACT

A variable speed feed roll drive mechanism as provided for a forage harvester, the mechanism including a reversible hydrostatic transmission having its input shaft coupled with the chopper input shaft, the output of the transmission being coupled with the feed rolls. The hydrostatic transmission, having an infinitely variable range of output speeds provides the capability to infinitely vary the length of cut of crops passing through the chopper.

3 Claims, 5 Drawing Figures

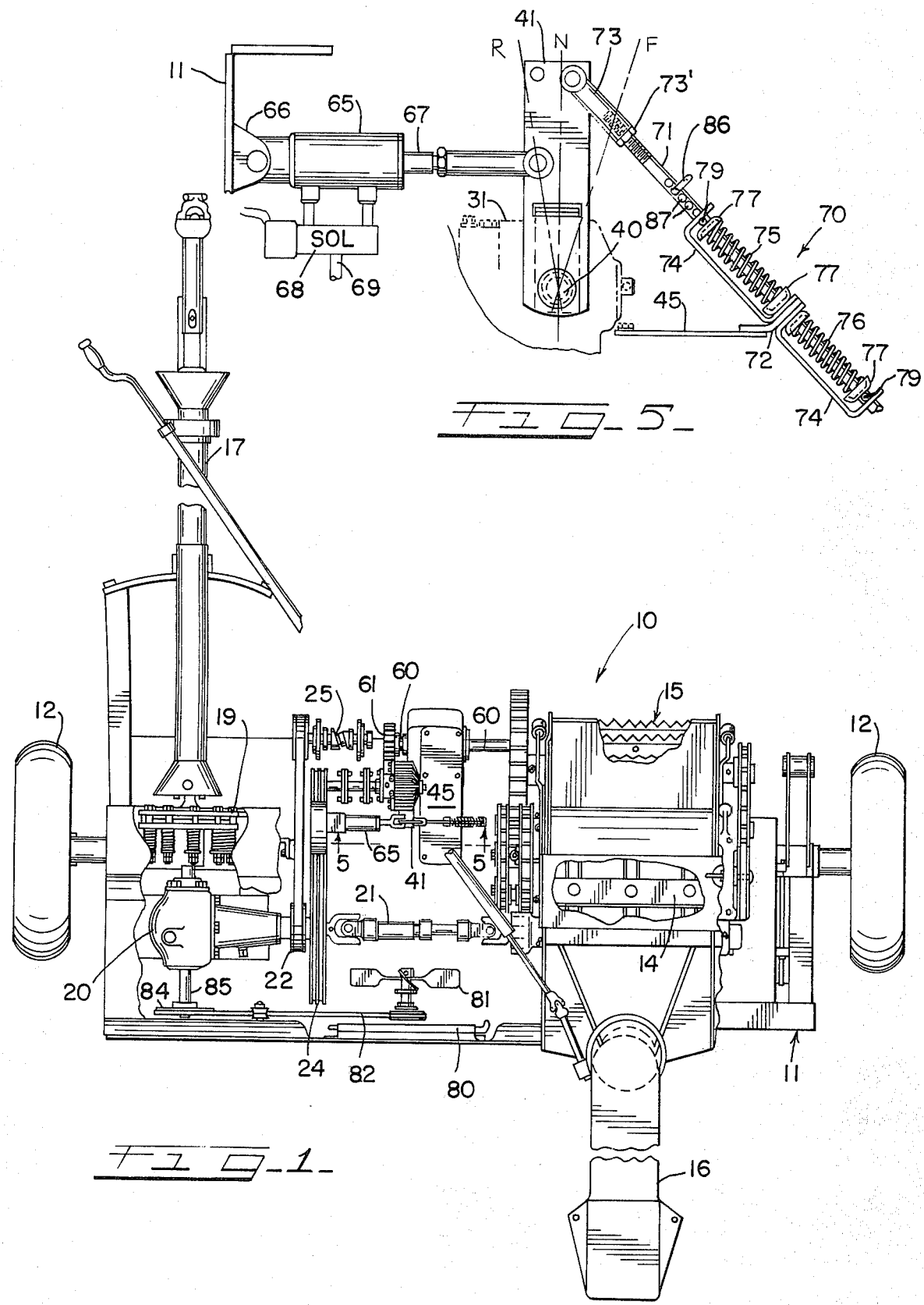

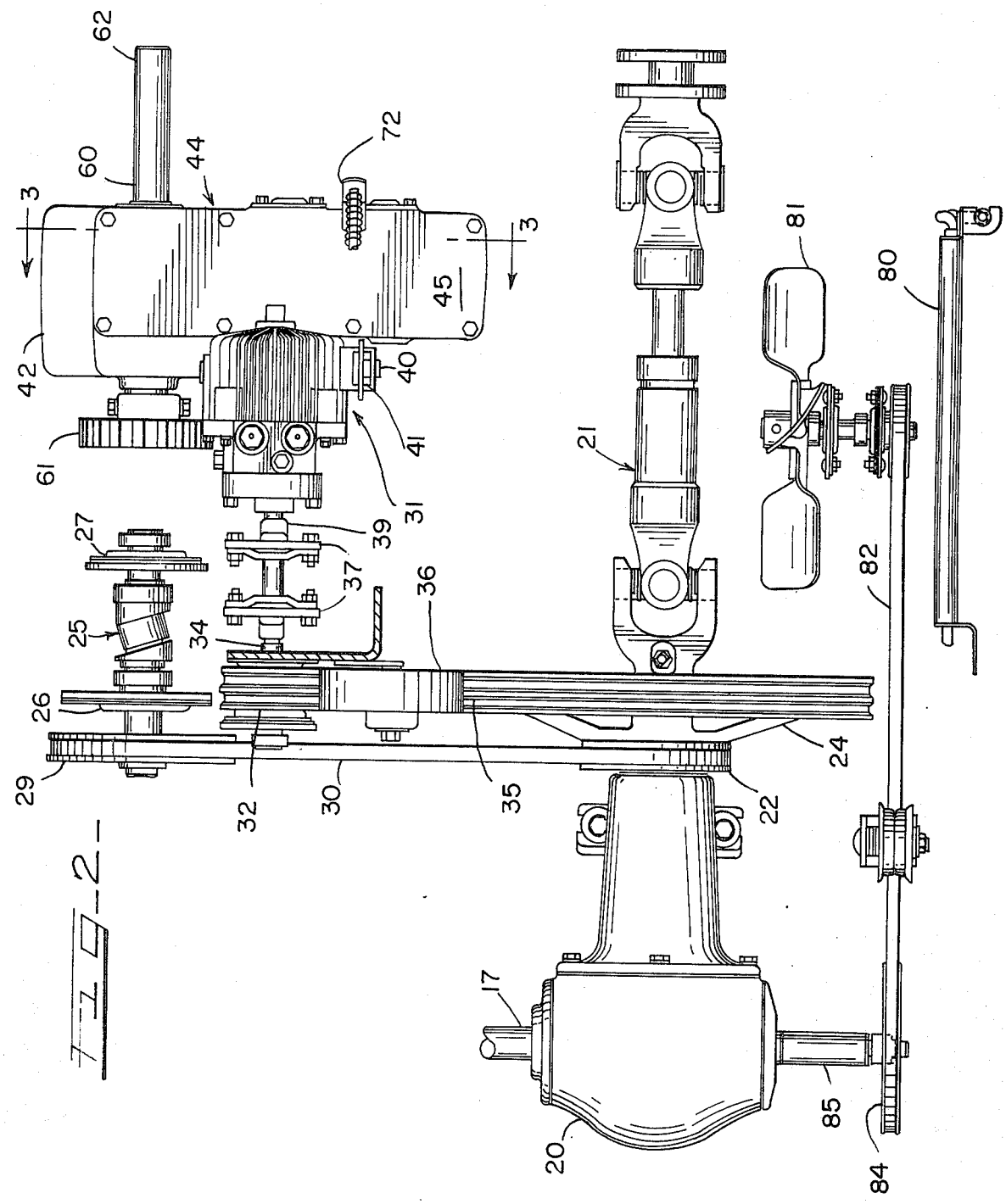

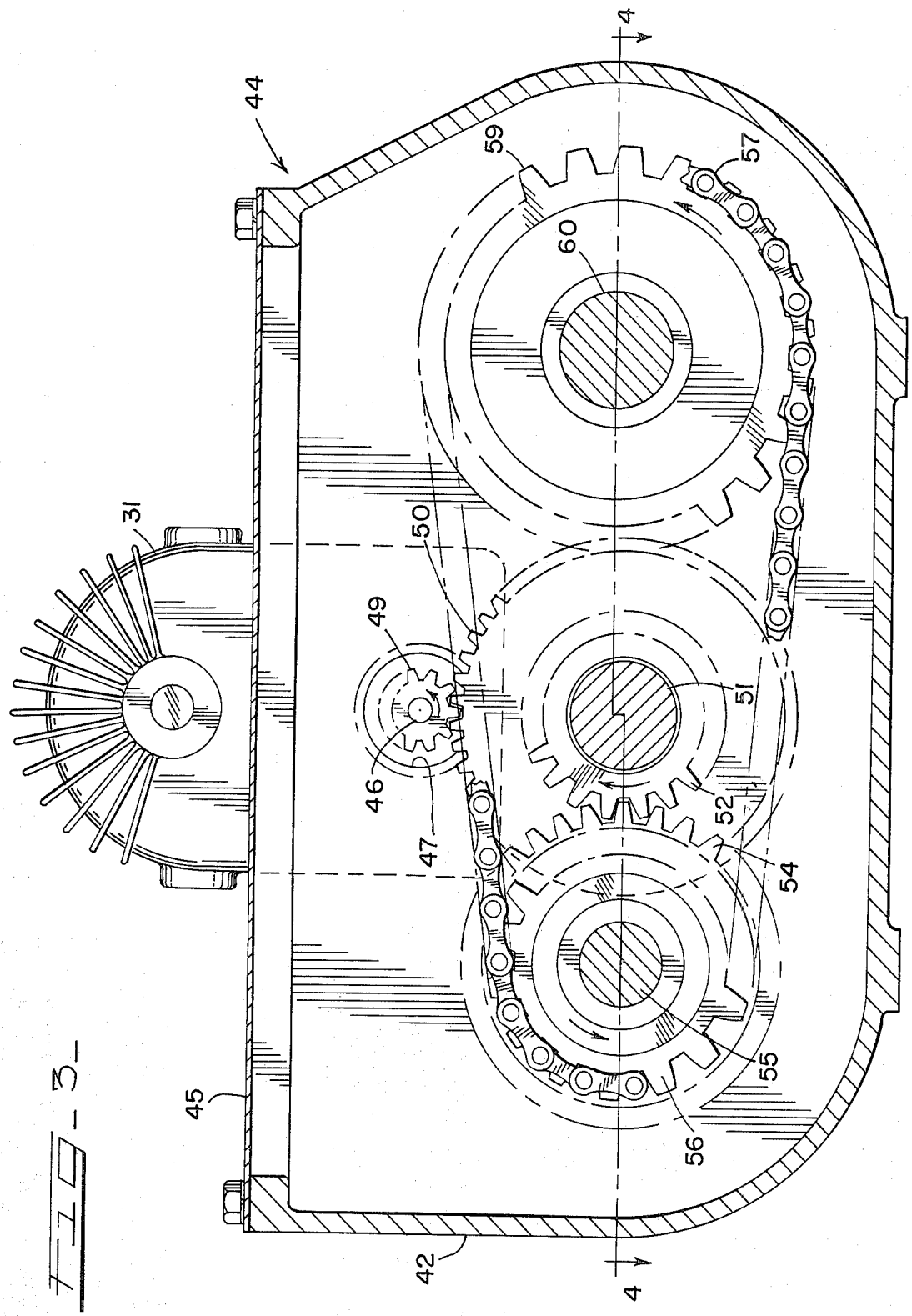

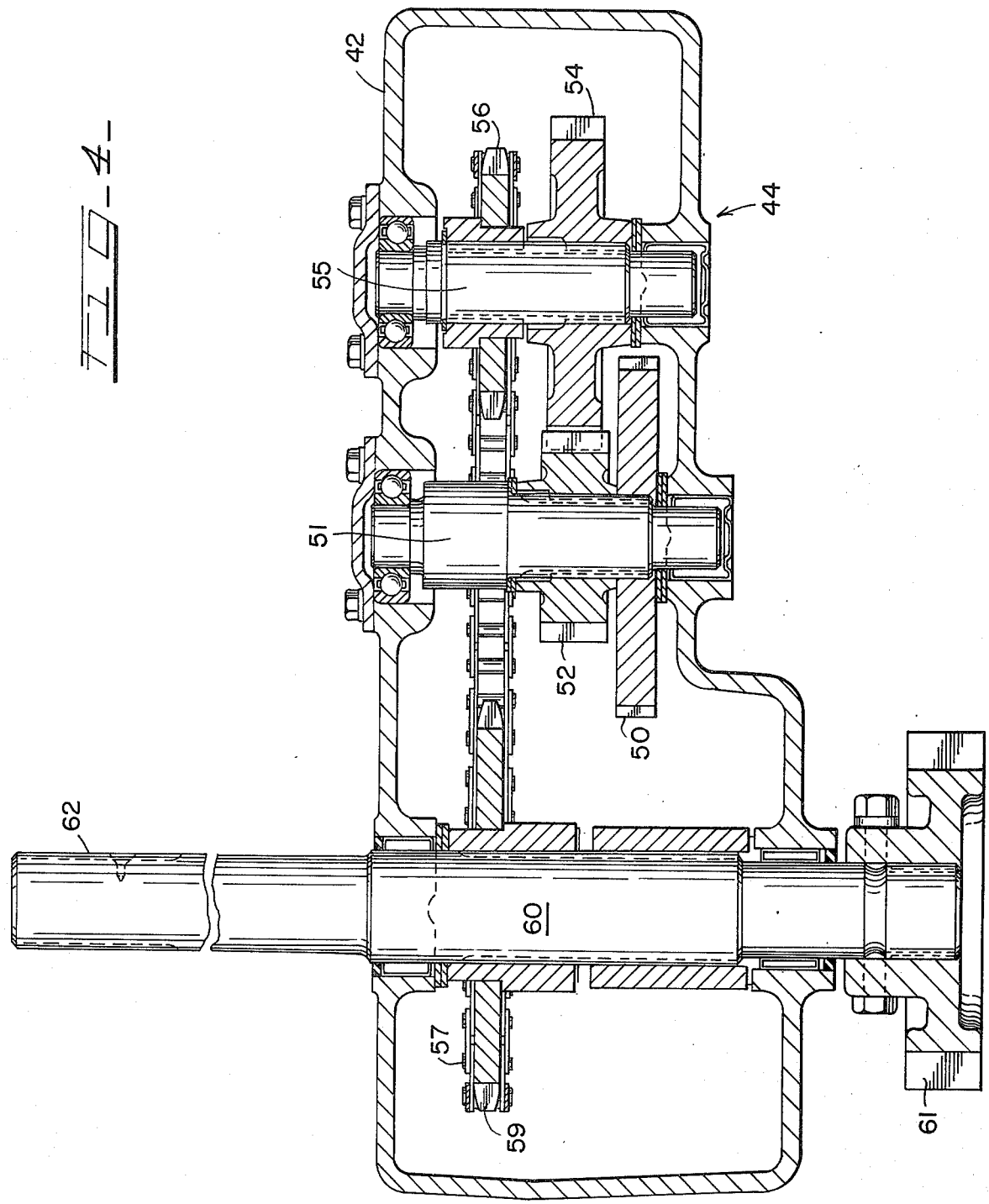

VARIABLE SPEED FEED ROLL DRIVE MECHANISM FOR FORAGE HARVESTERS

BACKGROUND OF THE INVENTION

This invention relates to forage harvesters and more particularly to a feed roll drive mechanism therefor wherein a hydrostatic transmission is utilized to vary the length of cut of crops processed by the chopping mechanism.

The ability to vary the length of cut of crops processed by the forage harvester is a necessary feature thereof, since various factors, such as type of silo and type of animal, for example, beef cattle or dairy cattle, are said to require longer or shorter cuts of silage for the most efficient utilization thereof.

Heretofore forage harvesters have had a mechanical drive for driving the feed roll mechanism. In order to vary the length of cut, various gear combinations were provided to change the speed of the feed rolls relative to the chopper. On some machines, a gear had to be physically changed to achieve this result. Others have provided mechanical shifters for switching from one gear to another. A further means of changing the length of cut involved removing a number of blades from the chopper. However, all of these arrangements suffer the common disadvantage of having the length of cut restricted to a few optional choices, some of which require interchanging or removing parts.

SUMMARY OF THE INVENTION

Accordingly, it is an object of the invention described herein to provide a feed roll mechanism wherein the length of cut may be infinitely varied.

It is further an object of the invention to provide a feed roll drive mechanism wherein the rolls may be reversed for eliminating blockage thereof.

It is further an object of the invention to provide means for driving the gathering mechanism of an attachable harvesting mechanism wherein the speed of the feed rolls and that of the gathering mechanism have a fixed relationship, thus preventing the feed roll mechanism from being loaded beyond capacity.

Another object of the invention is to provide means associated with said feed roll drive mechanism for operating a cutting mechanism on said harvesting unit at a speed independent of said feed roll speed to maintain an adequate cutting speed at all times.

Specifically, these objects are met by providing a controlled reversible hydrostatic transmission having an output shaft speed infinitely variable from neutral to full speed wherein the output shaft drives both the feed roll mechanism and the harvesting unit gathering mechanism, the power input to said transmission being operatively associated with the chopper drive means and the drive means for said harvesting unit cutting mechanism.

BRIEF DESCRIPTION OF THE DRAWINGS

Other objects and advantages of the invention will become apparent upon reading the following detailed description and upon reference to the drawings in which:

FIG. 1 is a plan view of a forage harvester incorporating the invention described herein with portions eliminated therefrom for the sake of clarity;

FIG. 2 is a plan view similar to FIG. 1 but illustrating only the drive means for the various components;

FIG. 3 is a side sectional view of the gear box shown in FIG. 2 taken along the line 3—3 thereof;

FIG. 4 is a sectional view of the gear box shown in FIG. 3 and taken along the line 4—4 thereof;

FIG. 5 is a side elevational view of a portion of the invention shown in FIG. 1 illustrating the actuating and control means for the transmission and taken along the line 5—5 of FIG. 1.

DETAILED DESCRIPTION OF THE INVENTION

Turning first to FIG. 1, there is shown a forage harvester generally designated 10 of the type generally known to the art, which comprises a frame 11 supported by ground wheels 12 and adapted to be hitched to a pulling tractor. The forage harvester further comprises a driven rotary chopping mechanism 14 for chopping crops fed to it by a feed roll mechanism 15 located forwardly thereof, the crops being expelled from the harvester 10 through an upward and rearwardly extending discharge chute 16. The forward portion of the forage harvester is adapted to receive a forwardly extending crop gathering unit (not shown) which may be a standard row crop unit or hay pickup and which may have a cutting mechanism and gathering mechanism for harvesting and delivering cut crops to the feed roll mechanism 15 in accordance with the art.

The feed roll mechanism 15 is of a type generally known in the art and comprises two pairs of upper and lower rolls spaced forwardly of the chopping mechanism, all of the rolls being connected by sprockets and chains and the lower front row being connected to the feed roll drive means. The crops pass between the upper and lower rolls to the chopper. A complete description of this mechanism may be obtained by reference to U.S. Pat. No. 3,511,287 to M. L. Hoch et al.

Driving means for the forage harvester 10 comprises a PTO shaft 17 which receives power from the pulling tractor at a standard speed such as 540 or 1000 rpm and delivers it rearwardly through an overload clutch 19 to a right angle drive 20. From the right angle drive 20, a shaft assembly 21 extends transversely to drive the chopping mechanism 14, the shaft assembly 21 having suitable universal joints to allow for misalignment. Intermediate the ends of the shaft assembly 21, preferably adjacent the right angle drive, the shaft assembly 21 is provided with sheaves 22 and 24 rotationally affixed thereto for respectively driving the gathering unit cutting mechanism drive means and the feed roll drive mechanism.

The gathering unit cutting mechanism drive means comprises a wobble shaft 25 which is rotatably mounted in bearings 26 and 27 supported by the harvester frame 11 and carries a sheave 29 which is driven from sheave 22 by belt 30. It will be appreciated that the wobble shaft 25 could be as conveniently mounted on the gathering unit itself.

The input drive means to the feed roll transmission 31 comprises a pair of small pulleys 32 mounted on a shaft 34 supported by bearings on the harvester frame 11. The pulleys 32 are driven through a pair of belts 35 by sheave 24, a suitable belt tightener 36 riding on the belts 35. The pulleys 32 are considerably smaller than the sheaves 24 in order to produce a rotational speed at the pulleys 32 of about 3600 rpm, an efficient operating speed for the transmission 31. The shaft 34 is coupled through a pair of universal joints 37 to the input shaft 39 of the transmission 31, the universal joints serving to correct misalignments.

The transmission 31 is a standard type of hydrostatic transmission known to those skilled in the art and has a charging pump, a fixed displacement motor and a variable displacement pump, the means for controlling the displacement of the pump and, consequently, the output speed of the transmission comprising a control shaft 40 and control lever 41. The output speed of said transmission is variable within a range from a maximum speed of about 3600 rpm in the forward or counter-clockwise direction, as viewed from the right side, through zero or neutral to a maximum speed of about 2000 rpm in the reverse direction. The maximum speed in the reverse direction is relatively unimportant since reverse is only used for cleaning out the harvester and no cutting is done. It has been found that the maximum speed of 2000 rpm is not only adequate but provides more satisfactory operation. Since the invention described herein does not reside in the transmission itself, further discussion of it would not be useful; however, for those interested in a complete description in such a transmission, the reader is referred to U.S. Pat. No. 3,360,933 to W. C. Swanson, et al.

The transmission 31 is mounted to the housing 42 of a speed reducing gear box assembly 44 mounted on the harvester frame 11, the gear box assembly being provided with a cover plate 45. As best seen in FIGS. 3 and 4, the output shaft 46 of the transmission 31 extends through an opening 47 in the housing 42 and receives a spur gear 49 having twelve teeth thereinside. The gear 49 meshes with a sixty-six tooth gear 50 mounted on a countershaft 51 rotatably supported parallel to the transmission output shaft 46 in the housing 42 below the transmission shaft opening 47. A 21 tooth gear 52 is mounted to the countershaft 51 adjacent the gear 50 for rotation therewith, the teeth of the gear 52 meshing with the teeth of a 34 tooth gear 54 mounted on a second parallel countershaft 55 rotatably supported in the housing 42 adjacent the countershaft 51. A 16 tooth sprocket 56 is mounted on the second countershaft 55 adjacent the gear 54 for rotation therewith, the sprocket 56 driving through a chain 57 a 25 tooth sprocket 59 affixed to the gear box output shaft 60 which is rotatably mounted parallel to the countershaft in the housing 42 and extends externally on both sides thereof. Thus, when the transmission 31 delivers power in the forward direction, as indicated by the arrow on gear 49 in FIG. 3, the gear 49 drives the gear 50, the countershaft 51, an the gear 52. The gear 52 in turn drives the gear 54, the second countershaft 55 and the sprocket 56. The sprocket 56 drives the sprocket 59 and the output shaft 60. The overall speed reduction for the specific arrangement turns out to be approximately 13.9:1, thereby producing output shaft speeds up to about 250 rpm.

The left end of the output shaft 60 carries a gear 61 which comprises the drive means for the gathering mechanism of the crop gathering unit and is adapted to mate with a complemental gear thereon. The right end 62 of the gear box output shaft 60 extends to the feed roll mechanism 15 whereat it is drivingly connected thereto such that when the output shaft 60 is rotated in the forward direction as indicated by the arrow in FIG. 3, the feed mechanism 15 moves the crops toward the chopper mechanism 14. Since the drive means for the crop gathering unit and the drive means for the feed roll mechanism are both connected to the output shaft 60, their relative speeds remain unchanged, thereby providing a continuous flow of crops to the feed roll mechanism without blockage or open spaces caused by the gathering mechanism operating at a higher or lower relative speed than the feed rolls.

Referring now to FIG. 5, the transmission control lever 41 is positioned to rotate from the "F" or maximum speed forward position through "N" or neutral position to the "R" or maximum speed reverse position. The control lever 41 is provided with spring means sufficient to urge it to the "N" or neutral position and with selectively adjustable stop means to limit the travel of the lever in the "F" or forward direction. Since the position of the control lever 41 controls the speed of the feed roll mechanism 15 which in turn determines the length of cut of crops being processed, the control lever stop means enables the operator to select a definite repeatable length of cut.

The spring means takes the form of a spring assembly 70 comprising a rod 71 having a clevis 73 threaded on one end, a locking net 73' preventing relative rotation therebetween. The clevis 73 is pivotally connected to the upper end of the control lever 41. The rod 71 extends freely through a bracket 72 mounted on the gear box housing cover 45. Located on either side of the bracket 72 but not connected thereto, are "U"-shaped spring retaining brackets 74, the rod 71 extending through the legs thereof and through identical upper and lower springs 75 and 76 and retainers 77 placed between the legs. The rod 71 is provided with a pair of transverse pins 79 located between the spring retainer 77 and the legs of the brackets 74 which are remote from the bracket 72. Thus, when the control lever is moved to the "F" position, the upper of the pins 79 compresses the upper spring 75, the lower spring 76 and its retaining bracket 74 moving away from the bracket 72. The upper spring 76 then urges the lever back to the "N" position. If the lever 41 is moved toward the "R" position, the same action occurs with the lower spring 76 being compressed and the upper spring 75 and retaining bracket 74 moving away from the bracket 72.

The selectively adjustable stop means comprises a quick attach pin 86 placed through one of a plurality of complemental transverse holes 87 provided in the rod 71 above the upper spring bracket 74. It can be seen from FIG. 5 that the travel of the control lever 41 in the "F" direction is limited by the quick attach pin 86 contacting the bracket 74 and that this limit may be grossly adjusted by moving the pin 86 from one of the holes 87 to another.

The actuating means for the control lever 41 comprises a double acting hydraulic cylinder 65 having its body pivotally connected to a gusset 66 welded to the harvester frame 11 and having its rod end pivotally connected to the lever 41 intermediate its ends. The two inlet ports of the hydraulic cylinder 65 are connected respectively to two outlet ports of electric solenoid valve 68, the solenoid valve 68 having its inlet port 69 connected through tubing (not shown) to the charging pump of the transmission 31. The solenoid valve 68 is a standard type four port three position valve having a position for pressurizing each of the ports of the hydraulic cylinder and a third position for relieving the pressure on both sides and is adapted to be remotely controlled by an operator on the pulling tractor and may be suitably attached for this purpose to a three position electrical switch provided thereon. While it is recognized that the hydraulic cylinder 65 itself could be suitably connected to one of the four port three position hydraulic control valves generally provided on the pulling tractor, the above arrangement provides the advantage that if the charging pressure is lost in the transmission 31 the spring means 70 will automatically return the control lever to the neutral position thereby preventing damage to the transmission 31 as might be caused by excessive leakage either external or internal.

In order to cool the fluid used in the transmission 31, a heat exchanger 80 is attached near the rear of the frame 11 and is connected with the transmission by hydraulic tubing (not shown), the pressure and charging pump within the transmission 31 providing the means for maintaining the required flow therethrough. A fan 81 is rotatably mounted to the frame 11 forward of the heat exchanger 80 and is driven by a belt 82 which in turn is driven by a sheave 84 mounted on a shaft 85 extending from the rear of the right angle drive 20. Since the right angle drive 20 is located before the transmission 31, the fan 81 is driven at a speed independent of the feed roll mechanism, thus maintaining sufficient cooling of the hydraulic oil at all times during operation of the harvester.

Thus it is apparent that there has been provided, in accordance with the invention, a forage harvester feed roll drive mechanism that fully satisfies the objects, aims, and advantages set forth above. While the invention has been described in conjunction with specific embodiments thereof, it is evident that many alternatives, modifications, and variations will be apparent to those skilled in the art in the light of the foregoing description. Accordingly, it is intended to embrace all such alternatives, modifications, and variations as fall within the spirit and broad scope of the appended claims.

What is claimed is:

1. A feed roll drive mechanism for a forage harvester having a feed roll mechanism mounted forwardly of a rotary chopping mechanism for delivery of crop thereto, said chopping mechanism having drive means, said forage harvester being adapted to receive a forwardly mounted gathering unit and having means for feeding crops to said feed roll mechanism, comprising:
   a housing;
   power input means driven by said chopping mechanism drive means;
   a reversible hydrostatic transmission, said transmission including a charging pump, driven by said power input means and mounted on said housing and having an output shaft extending therewithin, the forward speed of said output shaft being infinitely variable relative to said input drive means within a range from zero to a maximum;
   fixed ratio speed reduction means mounted entirely within said housing, said speed reduction means being driven by said transmission output shaft;
   A feed roll drive shaft drivingly connected to said feed roll mechanism and extending within said housing to a driven connection with said speed reduction means;
   control means associated with said transmission for controlling the speed of said output shaft; and
   actuating means operatively associated with said control means for selectively determining the speed of said feed roll mechanism relative to said input drive means, said actuating means selectively positioning said control means in one of three positions consisting of maximum forward, neutral, and reverse, selectively adjustable stop means being operatively associated with said control means for defining said maximum forward position of said control means.

2. The invention in accordance with claim 1 and said actuating means comprising a double acting hydraulic cylinder operatively connected with a four port, three position electric solenoid valve adapted for remote control, said solenoid valve having an inlet port in fluid communication with said transmission charging pump whereby said solenoid is effected to extend said cylinder in one position, retract said cylinder in a second position, and neutralize said cylinder in a third position.

3. For a forage harvester of the type adapted to receive a forwardly mounted crop gathering unit and having a rotary chopper driven from an input shaft and a feed roll mechanism delivering crops to said chopper, a variable speed feed roll drive mechanism for infinitely varying the length of cut of crops processed by said harvester comprising:
   a hydrostatic transmission drivingly coupled with said chopper input shaft and having an output shaft, the speed of said output shaft being infinitely variable within a range relative to said input shaft from a maximum speed forward to a maximum speed reverse;
   control means for said transmission, said control means comprising a rotary control lever connected to said transmission and rotatable within a range corresponding to the range of said output shaft speed, actuating means for selectively positioning said control means in one of three positions consisting of maximum forward, neutral, and reverse and selectively adjustable stop means for limiting the travel of said control lever in the maximum speed forward direction; and,
   a speed reducing gear box of permanently fixed ratio driven by said hydrostatic transmission, said gear box having an output shaft for driving said feed rolls, said output shaft being provided with an output gear adapted to drive said gathering unit.

* * * * *